Jan. 22, 1929.
H. J. O'BRIEN
1,699,855
FRUIT BASKET
Filed April 19, 1926
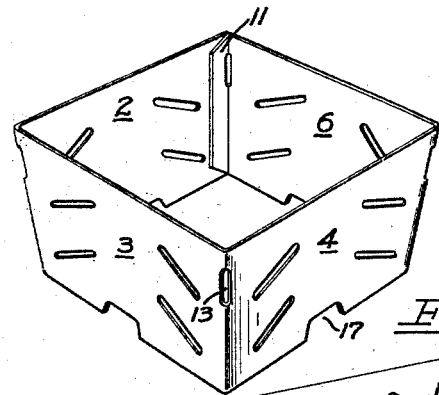
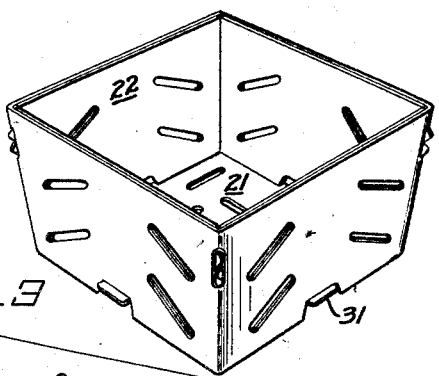
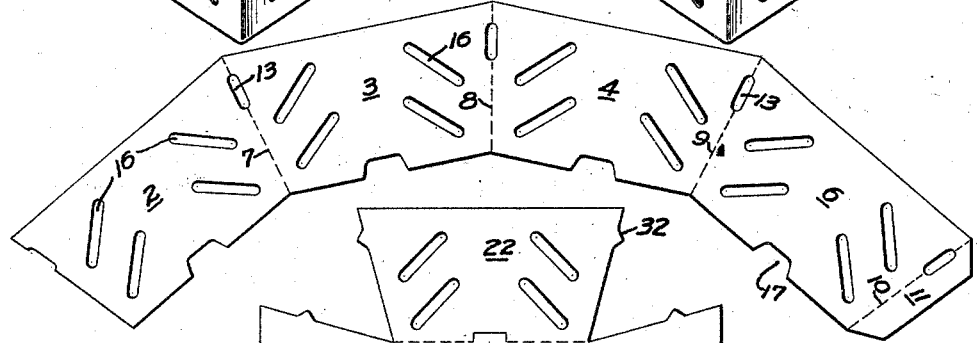
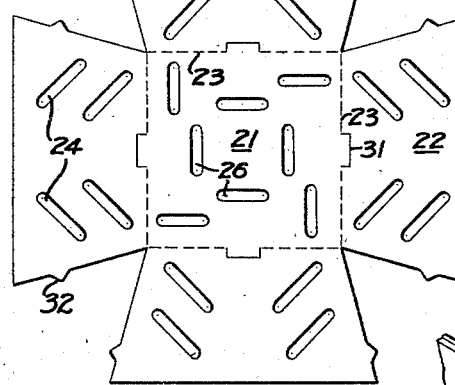
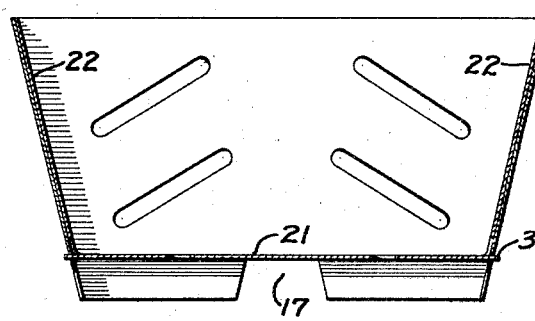
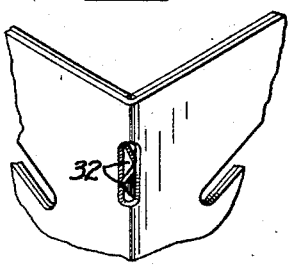
INVENTOR
HERBERT J. O'BRIEN
By Charles S. Evans
HIS ATTORNEY.

Patented Jan. 22, 1929.

1,699,855

UNITED STATES PATENT OFFICE.

HERBERT J. O'BRIEN, OF SAN FRANCISCO, CALIFORNIA.

FRUIT BASKET.

Application filed April 19, 1926. Serial No. 102,858.

My invention relates to a container, and particularly to a basket in which fruit and berries are packed for transportation and sale.

An object of my invention is the provision of a basket that can be quickly and easily assembled and the parts of which have automatically interlocking means for holding it securely in set-up form.

Another object of my invention is the production of a basket having a plurality of ventilating apertures to insure uniform and thoro ventilation.

Another object of my invention is the provision of a sanitary basket for fruit which is impervious to moisture, and which prevents decay of the fruit or fungus growths.

My invention possesses other objects and features of advantage, some of which, with the foregoing, will be set forth in the following description of the preferred form of my invention which is illustrated in the drawings accompanying and forming part of the specification. It is to be understood that I do not limit myself to the showing made by said drawings and description, as I may adopt variations of the preferred form within the scope of my invention as set forth in the claims.

Referring to the drawings:—

Figure 1 is a perspective view of the outer band portion of my fruit basket.

Figure 2 is a perspective view of the fruit basket in assembled or set-up form.

Figure 3 is a plan view of the sheet or blank comprising the outer band of the basket as it appears before folding and before the ends are united.

Figure 4 is a plan view of the blank comprising the liner of the basket as it appears before folding.

Figure 5 is a sectional view of the basket taken in a vertical plane midway between two opposite sides.

Figure 6 is a fragmentary perspective view of a corner of the basket showing the automatic lock in the side walls.

Broadly my invention comprises a fruit basket preferably formed of a fibrous material such as paper board, and made up of two portions, an outer band and a liner for the band. The band is cut from flat stock, folded, and the ends adhesively united to form a continuous band. The liner or inner portion, preferably made from a paraffined stock, is adapted to nest in the band, and comprises a bottom having flaps thereon to form sides. The sides of the band extend below the bottom of the liner, and suitable provision is made to allow air to circulate under and thru the bottom of the basket, as well as thru aligned ventilating apertures cut in the band and sides of the liner. Interlocking means which automatically engage when the parts are assembled, are interposed between the band and liner to maintain the position of the liner within the band, and to increase the rigidity of the structure.

The basket of my invention is made of a fibrous material of suitable weight, and is preferably paraffined so that a sanitary moisture-, fungus-, and decay-proof surface is provided. A basket made of such material is not affected by changes in temperature and moisture and will not warp or split as wooden baskets frequently do. If desired the outer portion may be made of a heavier and cheaper grade of material than the inner portion and it does not necessarily have to be paraffined. I have found it desirable to use a water-proofed liner of good quality and for this purpose a thin chip board having asphalt incorporated in it, or a paraffined board may be used.

In detail, my invention comprises a band having four sections 2, 3, 4, and 6, defined by the transversely extending creases 7, 8, 9, and 10. The sides of the sections coincident with the sides of the strip are parallel, but the other opposite sides of each section converge symmetrically so that when the flap 11, which is formed at one edge of the strip, is adhesively united to the other end of the strip, a tapered square ring or continuous band is formed. This continuous band comprises the outer portion of my basket and is shown in Figure 1 of the drawings. On each of the transverse creases 7, 8, 9, and 10, is a slot 13, which is preferably formed adjacent the upper edge of the band. A plurality of ventilating apertures 16 are also provided in each section of the band; and are preferably cut on lines forming an acute angle with the upper edge of the basket. This arrangement of the ventilating apertures does not weaken the sides or tend to create a fold line as other arrangements have been found to do; and it is possible to lift the filled basket of my invention by the upper edge of one side without injury or distortion. I also provide notches 17, preferably in the center of the lower edge of each section of the band, and these notches assist in the ventilation of the basket.

The inner or liner portion of my basket comprises a flat sheet blanked out as shown in Figure 4, and comprising a bottom 21, the perimeter of which is greater than the perimeter of the lower edge of the band, so that in set-up form the bottom is supported by the sides of the band and does not contact with the surface upon which the basket rests. On each side of the bottom is a flap 22, divided therefrom by a crease or fold 23, and which is exactly the same size as the inside surface of each of the sides of the band above the bottom, so that when the flaps are folded up the liner member nests snugly in the ring member, the lateral edges of the flaps 22 coming together in a tight joint in each corner. Since the band is tapered, and the flaps on the liner are similarly shaped, there is a wedge action which tends to tighten the joints when the basket is in use.

Ventilating apertures 24 are provided in the flaps and arranged to coincide with the apertures 16 in the band when the two portions of the basket are nested together. Additional ventilating apertures 26 are provided in the bottom and due to the fact that the bottom of the basket is spaced above the lower edge of the sides, the air may circulate freely thru the notches 17 and the apertures 26 thus insuring thoro ventilation of the container and its contents.

To resist separation of the basket parts after assembly of the liner within the band, a tab 31 is struck out so as to project from each side of the bottom. These tabs are formed when the blank is cut and are integral and coplanar with the bottom 21. To further maintain the position of the liner and prevent racking of the basket, tongues 32 are provided on the lateral edges of each flap, the tongues on two oppositely disposed sides being slightly nearer the upper edge than the tongues on the other two oppositely disposed sides, so that when the liner is folded they will interlock with each other. The parts are so arranged and proportioned that the band and liner may be assembled with substantially a single motion, the flaps bending upwardly as the liner is seated in the band. As the tapered lateral edges of the flaps seat against the edges of adjacent flaps, the tabs 31 automatically snap into place under the edges of the notches 17, and the tongues 32 automatically interlock with each other in the slots 13.

By the use of the interlocking tongues 32 a more rigid basket structure is provided than has heretofore been possible. If in picking up the filled basket pressure is exerted on two oppositely disposed sides, the liner on such sides will maintain its position thruout the operation as the tongues prevent inward movement of the flaps. Should the filled basket be lifted by one corner, the two adjoining corners will not be affected as lateral movement of the flaps is resisted by the interlocked tongues.

I claim:

1. A fruit basket comprising a continuous outer band having slots at each corner, a liner comprising a bottom and flaps forming sides on the bottom, and tongues on the lateral edges of each flap in engagement with each other and in the slots in said band.

2. A fruit basket comprising a continuous outer band having slots at each corner, a liner comprising a bottom and flaps forming sides on the bottom, and tongues on the lateral edges of each flap, the tongues on two oppositely disposed sides being higher than the tongues on the other two oppositely disposed sides to permit adjacent tongues to engage with each other and in a slot of the band.

3. A fruit basket comprising a continuous outer band having notches in its lower edge and slots at each corner, a liner comprising a bottom and flaps forming sides on the bottom, and integral means on said flaps and bottom for engaging said slots and notches to lock the parts together.

4. A fruit basket comprising a continuous outer band having notches in its lower edge and slots at each corner, a liner comprising a bottom and flaps forming sides on the bottom, integral tabs on said bottom engaged in said notches, and tongues on the lateral edges of each flap in engagement with each other in the slots in said band.

In testimony whereof, I have hereunto set my hand.

HERBERT J. O'BRIEN.